Inventors
B. Serra
V. Serra
M. Serra
J. Serra

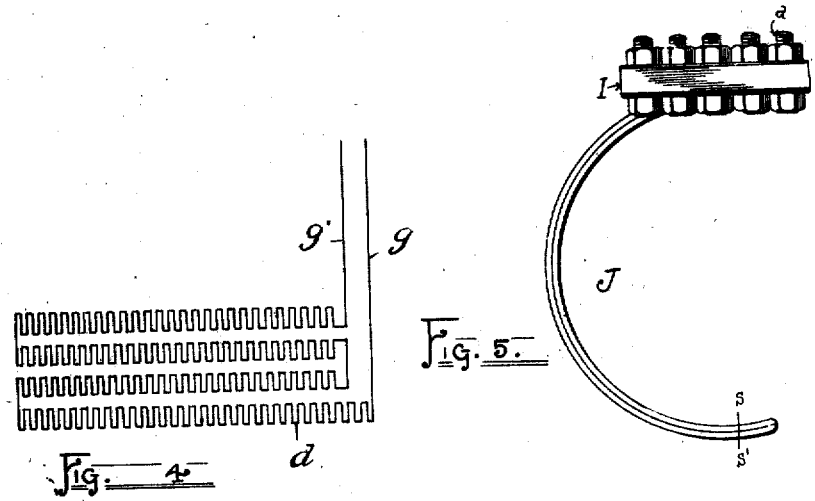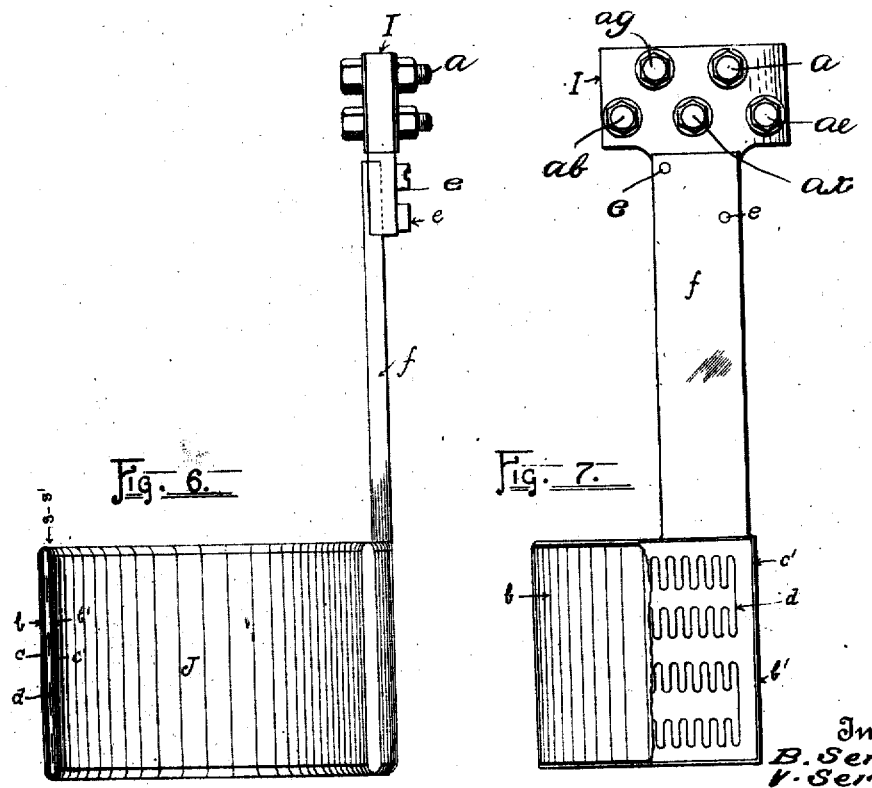

By Their Attorney

B., V., M. AND J. SERRA.
TYPE MAKING MACHINE.
APPLICATION FILED OCT. 21, 1918.
1,312,362.
Patented Aug. 5, 1919.
6 SHEETS—SHEET 5.
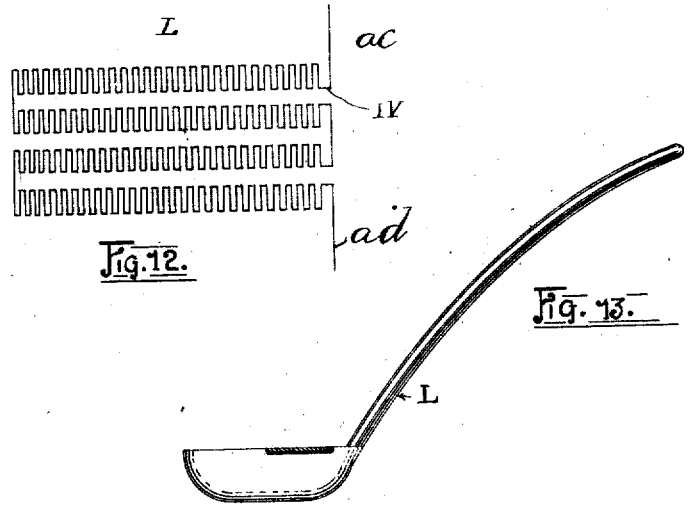
Fig. 12.
Fig. 13.
Fig. 14.
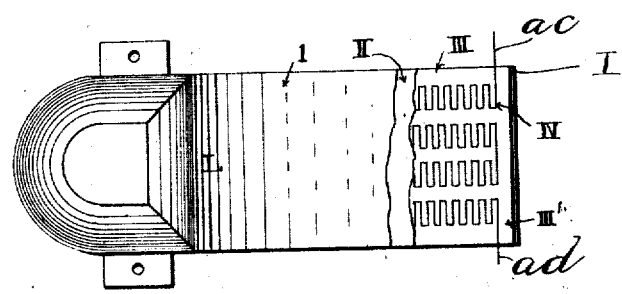
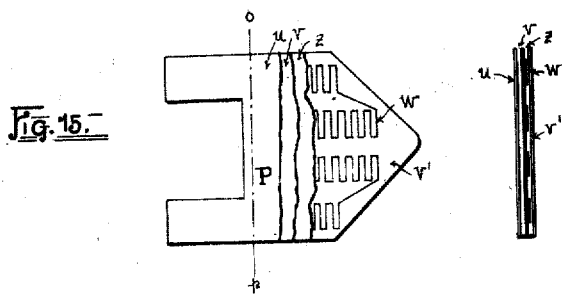
Fig. 15.
Fig. 16.
Inventors
B. Serra
V. Serra
M. Serra
J. Serra
By their Attorney

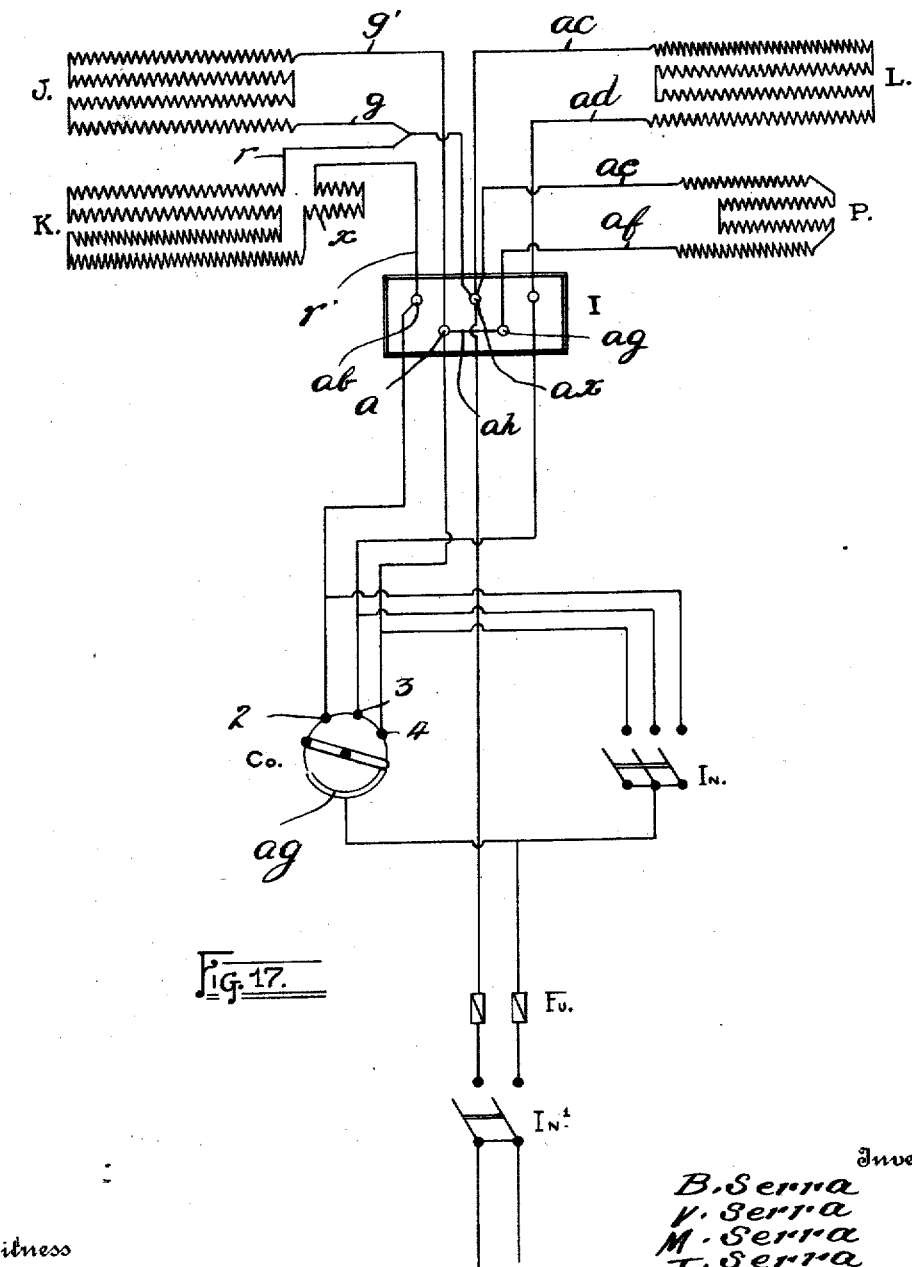

UNITED STATES PATENT OFFICE.

BARTOLOME SERRA, VICENTE SERRA, MELCHOR SERRA, AND JOSÉ SERRA, OF BUENOS AIRES, ARGENTINA.

TYPE-MAKING MACHINE.

1,312,362.   Specification of Letters Patent.   Patented Aug. 5, 1919.

Application filed October 21, 1916. Serial No. 258,975.

*To all whom it may concern:*

Be it known that we, BARTOLOME SERRA, VICENTE SERRA, MELCHOR SERRA and JOSÉ SERRA, subjects of the King of Italy, residing at Buenos Aires, Argentina, have invented certain new and useful Improvements in Type-Making Machines, of which the following is a specification.

The present invention refers to improvements in linotype, monotype, and in general, all machines for casting type and has for its object to provide certain improvements in the ovens of the same, which permit of the melting of the metal by means of electric current.

The present invention has for a further object the melting of the metal in the crucibles of linotype machines etc. of any of the types or marks in use, by means of electricity, employing for this purpose the same crucibles and oven of the machines and adapting thereto the special appliances which constitute the improvement in accordance with the present invention, appliances which are easily interchangeable and which permit, if so required, of a return being made in the operation of the said oven and crucibles, to the methods previously employed, viz. by means of the heat generated by gas or naphtha.

Among other advantages, the present invention comprises that of being easily applicable to all existing machines, without the necessity of any vital modification and solely by the adaptation thereto of electrical appliances of simple description and economical operation. Another advantage is that already mentioned of the possibility of returning to the previous system of heating by simply removing the electrical appliances which have been attached.

In order that the invention may be clearly understood and easily operated, it has been represented by way of example, as applied to a linotype machine of the kind designated as No. 8, in the attached drawings, it being evident that it may be equally adapted to the other types of linotype machines, such as, for instance Nos. 3 and 5 of the type called Canadian.

In the said drawings:—

Fig. 4 is a drawing showing the disposition of the conductor in the auxiliary electrical apparatus pertaining to the inside of the crucible and the conductors which run to the contact plate.

Fig. 5 is a view from above of the heating apparatus proper, and contact plate.

Fig. 6 is a front view of the apparatus illustrated in Fig. 5, showing the section along the line S—S' of the said figure.

Fig. 7 is a similar view from the side with a portion of the iron plate removed in order to show the disposition of the mica plates and resistance wires.

Fig. 12 shows the disposition of the resistance wire in the heating apparatus external to the crucible.

Fig. 13 is a view in perspective of the external heating apparatus, ready to be placed in position.

Fig. 14 is the same seen from below, with a portion of the iron plate removed to show the disposition of the resistance wires.

Fig. 15 is a top view of the auxiliary heating apparatus of the mouth piece.

Fig. 16 is a sectional view along o—p of Fig. 15, and finally

Fig. 17 is a diagram of the connections of the electrical heating apparatus described.

In all the said figures the same reference letters and numbers indicate the same or corresponding parts.

With reference now to the said figures, A is the usual cast iron cover of the pot and crucible, B being the external jacket and C the crucible proper in which the metal is melted. D is the internal cavity of the crucible, for containing the metal. E is the space through which the metal is pressed and F the conduit along which the molten metal runs, coming out at the mouth piece or outlet G. H is the space between the jacket B and the crucible C, which space, as usual, is filled with asbestos or other insulating substance. M is the iron plate which supports the asbestos and N the arms which join the pot B to the linotype machine. All the parts described up to the present are the usual ones employed in the linotype machines of the various types in use, and to these parts are adapted the improved appliances in accordance with the present invention, which permit of the use of electric current for melting the metal in the interior of the crucible C.

These additional appliances comprise essentially: the rapid electric heater K placed in the interior of the crucible; another auxiliary electric heater J placed also inside the crucible C; an external electric heating apparatus L arranged on the outside of the said crucible C, beneath the conduit F, and finally an auxiliary electric heating apparatus P for the conduit F and outlet G. I is the general plate where the electric connections are made with the various electric heaters.

With reference to the auxiliary electric heating apparatus J inside the crucible C, represented in detail in Figs. 4 to 7 inclusive, $a$ and $ax$ are the connecting bolts, $b$ and $b'$ are iron plates, preferably 0.6 m/m. thick, in the space between which are placed mica sheets $c$ and $c'$, which insulate the resistance formed by the Nikcrom wire $d$, of 0.40 m/m. φ, arranged as shown in Fig. 4. $g$ and $g'$ are the conductors of electric current and $e$ the bolts by means of which the general contact plate is affixed to the part $f$ of the heater. The wire $g$ is connected to a bolt $a$ and wire $g'$ to the bolt $ax$. This auxiliary heater is placed inside the crucible C, close to the internal vertical walls of the same and adopts, as regards the metal plates $b$ and $b'$ a substantially semi-circular form.

Figure 1:
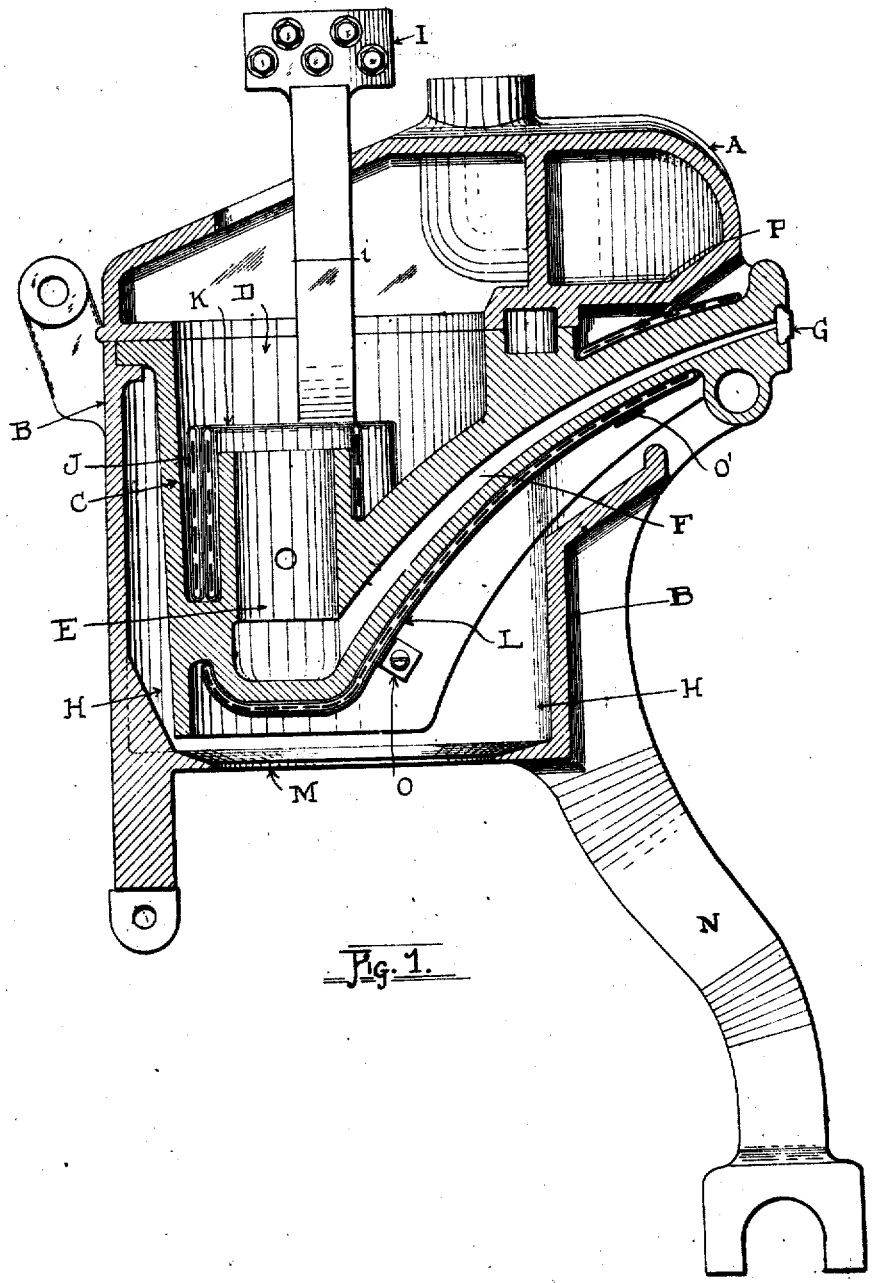
Figure 1 is a vertical transverse section of an oven of the usual type of a linotype machine.
Figure 2:
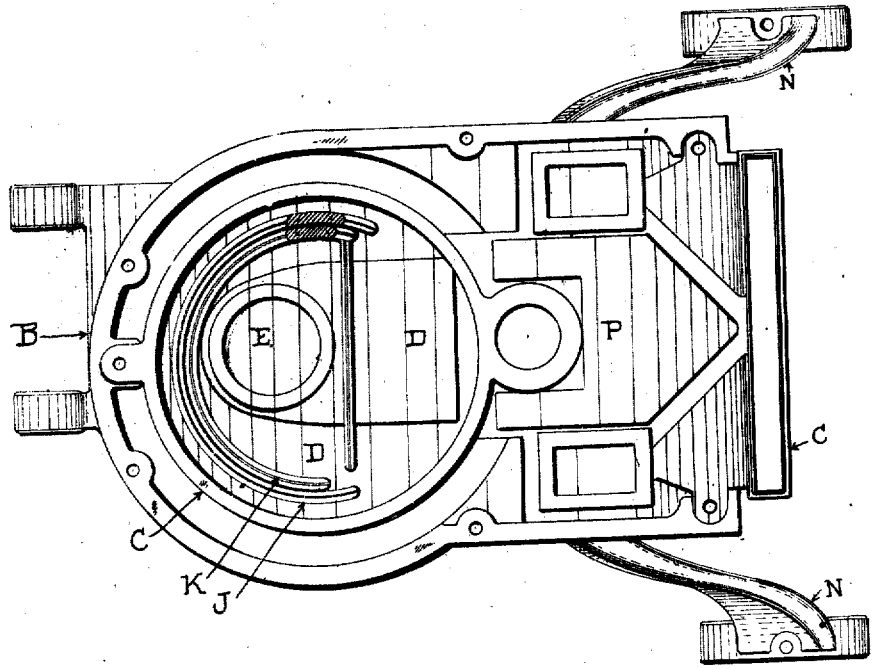
Fig. 2 is a view from above, of the melting pot, in which the cover has been eliminated in order to show the crucible and the heating apparatus.
Figure 3:
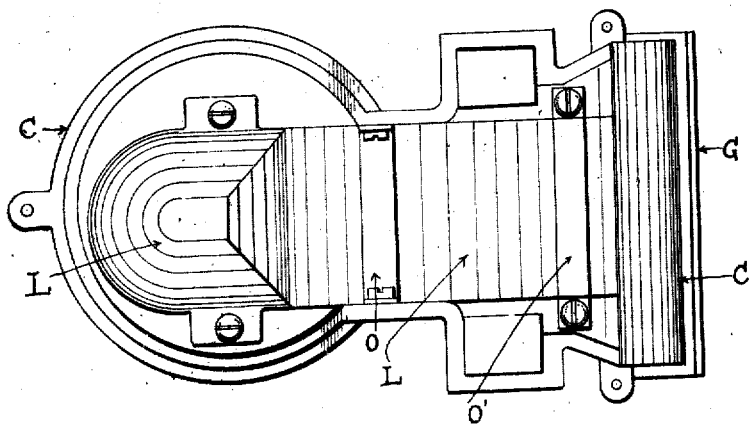
Fig. 3 is a view of the lower portion of the crucible, free from its fitting in the pot and jacket, and in which the heating apparatus is shown in position with its corresponding clamps.
Figure 8:
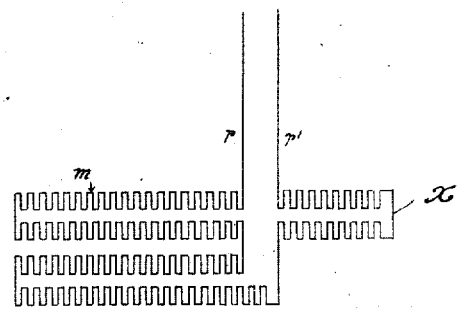
Fig. 8 shows the internal disposition of the resistance wire of the rapid heating apparatus inside the crucible.
Figure 9:
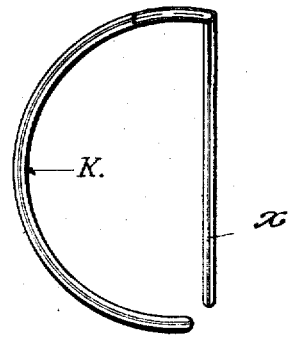
Fig. 9 is a view from above of the rapid heating apparatus.
Figure 10:
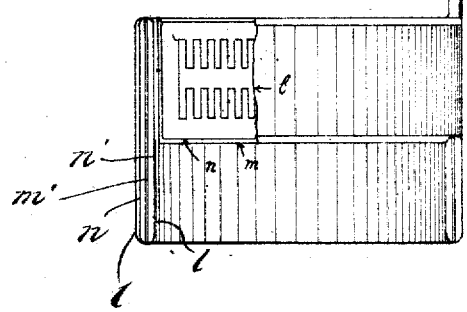
Fig. 10 is a front view of the same with a portion of the iron plate removed to show the resistance wire and the mica plate.
Figure 11:
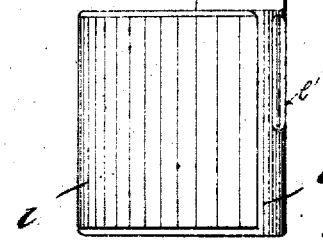
Fig. 11 is a side view of the same.

Inside the said auxiliary heater is arranged the rapid heater K which is specially illustrated in Figs. 8 to 11 inclusive. In the said heater $l$ and $l'$ are the iron plates and $n$ and $n'$ are mica sheets between which is placed the wire $m$ which forms the resistance. $r$ and $r'$ are the conductors which join the said resistance to the contact plate I. The wire $r$ is connected with the bolt $ax$ and wire $r'$ with a bolt $ab$. $f^a$ is the support to which is affixed the said contact plate I. As more clearly shown in Figs. 8 and 9, the inner heater K embodies a transverse member $x'$, inclosing a resistance $x$, connected in series with the wire $r'$.

The external heater of the crucible C, designated by L in the general figures and shown specially in Figs. 12 to 14 inclusive, is formed by an iron plate I which form the bottom of the heater. Upon this bottom plate is placed a sheet of asbestos II in order to prevent the penetration in a downward direction of the heat generated by the resistance, and upon this asbestos sheet are placed two sheets of mica III and III' between which is placed the resistance IV formed by a Nikcrom conductor of 0.40 m/m. φ.

By means of connections represented, the said resistance is also connected with the contact plate I, as may be clearly seen in the diagram in Fig. 17. The resistance IV is connected with a wire $ac$, which is connected with the bolt $ax$. The resistance IV is also connected with a wire $ad$, connected with a bolt $ae$. The iron plate I is adapted in its general configuration to the shape of the crucible C on the outside of its base. The asbestos sheet II, employed in order to prevent the heat from penetrating down to the level of the linotype machine proper, may be of any suitable thickness, it being nevertheless preferable to use a sheet of 2 m/m. thickness, which is the thickness most adaptable to the apparatus.

In order to maintain the outlet G at a suitable temperature, an auxiliary electric heater P is employed, as has already been stated, this heater being shown in detail in Figs. 15 and 16 of the attached drawings. This heater is formed by an external iron plate $u$, preferably 1 m/m. in thickness, upon which is placed a sheet of asbestos $v$ of 2 m/m. thickness in order to prevent the escape of the heat in a direction contrary to that of the outlet G of the crucible C. Z is a sheet of mica and W is a resistance formed by a Nikcrom wire of 0.20 m/m. φ placed between the sheet of asbestos and the sheet of mica. The resistance $w$ is connected with wires $ae$ and $af$. The wire $ae$ is connected with the bolt $ax$ and the wire $af$ with the bolt $ag$, in turn connected with the bolt $a$ by a wire $ah$. The shape of this heater is adapted to that of the outlet G referred to. The resistance W is joined by means of connections to the contact plate I as may be clearly seen in the diagram in Fig. 17.

With reference to this latter figure, J, K, L and P are the electric heaters which have just been described, represented by their respective resistances. I is the general contact plate. Co is a commutator with four points, of which 1 is the dead point, 2 that which establishes connection with the heater X, 3 that which connects with the heater L and 4 that connecting with the auxiliary heaters J and K. In is a tripolar interrupter for the direct feeding of all the heating apparatus. Fu are the fuses interposed in the general conductors and suitably calculated, and finally In' is the general interrupter. The manner in which the connections are arranged is clearly seen in the drawings and does not in any way constitute a feature of the invention, being within the reach of any person possessing a knowledge of electricity.

The general arrangement of the apparatus and its application to the ovens of linotype machines having now been described, the manner in which it operates will be explained.

The various heaters K, J, L and P having been placed in position as described and illustrated, the metal is placed in the cavity of the crucible C, destined for the purpose, it being preferable if possible to fill the said receptacle with metal already liquid or with small lines of linotype. The interrupter In' is then placed in circuit (Fig. 17) leaving the commutator Co in the position 1 and closing the circuit at the interrupter In. In this manner all the electric heating appliances enter into action. In the example illustrated the consumption is 7 amperes at 220 volts of continuous current and 6.5 amperes at 220 volts alternating current, or 1540 watts per hour. In this manner the metal melts progressively, arriving in 45 to 55 minutes at a temperature of from 570 to 600 degrees Fahrenheit, when it is ready to be used. When this moment has arrived the heat generated is excessive for the proper working of the machine, for which reason the electric circuit is then cut at the interrupter In and the heat is graduated by means of the commutator Co.

When it is desired to work only with the heat generated by the internal heater K, which keeps the metal at a temperature between 550 and 600 degrees Fahrenheit, without the heating of the outlet and suitable for a fast operator and short line work, the commutator is moved to the point 2, with an approximate consumption of 600 to 630 watts per hour.

When it is desired to work only with the external heater L, which maintains the metal between 520 and 560 degrees Fahrenheit and also heats the outlet, suitable for slow and long line work, the commutator is moved to the point 3 with an approximate consumption of 600 to 630 watts per hour.

Finally, in order to work with the auxiliary heaters J and P, suitable for intermittent work and which maintain the metal between 490 and 520 degrees Fahrenheit, the commutator Co is moved to the point 4, with an approximate consumption of 450 to 520 watts per hour.

All these changes may be made at will and without disturbing the working of the machine, as the various switches are placed where they can be moved conveniently by the operator of the machine.

When the crucible C is loaded with cold metal, the melting of same can be assisted by interposing for a few minutes the interrupter In.

The fitting of the electrical appliances described does not require any alteration in the shape of the pots, crucibles and other parts accessory to the linotype machine, whatever may be its type or mark, for which reason the invention may be easily adapted to all machines at present in use, which may also be operated by gas or naphtha as up to the present, it being only necessary for this purpose to remove the electric heating apparatus L.

It is evident that various modifications of construction or detail may be introduced without thereby departing from the sphere of the invention, whose essential features are clearly determined in the claim which follows this specification.

Having thus specifically described and determined the nature of the present invention and the manner of its operation, we declare that what we claim as our invention and exclusive right is:—

The combination with the melting pot of a linotype machine, of a dash-pot disposed within said melting pot in spaced relation thereto and having an inclined throat which is spaced from the top of the dash-pot, an approximately vertical double walled metallic casing arranged within the melting pot and being longitudinally curved into an approximately semi-circular form to partly surround the dash-pot and adapted to be lifted out of the melting pot, an auxiliary transverse double walled metallic casing secured to the first named metallic casing and disposed upon the opposite side of the dash-pot near its top and contacting with the inclined throat, a resistance arranged within each double walled metallic casing and insulated therefrom, an approximately vertical member connected with the first named double walled metallic casing and extending above and exteriorly of the melting pot and serving as a handle to remove the two double walled metallic casings, and electric terminals connected with the upstanding member and having electrical connection with the resistances.

In testimony whereof we affix our signatures.

BARTOLOME SERRA.
VICENTE SERRA.
MELCHOR SERRA.
JOSÉ SERRA.